Patented Oct. 26, 1954

2,692,866

UNITED STATES PATENT OFFICE 2,692,866

PROCESS FOR THE PRODUCTION OF CATION-EXCHANGING RESINS FROM PHENOLIC ETHERS AND PRODUCTS

Karl Haagen, Leverkusen-Bayerwerk, Germany, assignor to Farbenfabriken Bayer Aktiengesellschaft, Leverkusen, Germany, a corporation of Germany No Drawing. Application February 13, 1951, Serial No. 210,793

Claims priority, application Germany February 14, 1950

15 Claims. (Cl. 260—2.2)

The present invention relates to the production of cation-exchanging resins.

One object of the present invention is a process for the production of etherified aldehyde condensation products containing ion active groups.

A further object are the condensation products obtained according to this process.

The cation-exchanging resins prepared from aromatic hydroxy compounds show a limited stability to oxygen and alkalies due to the presence of free hydroxy groups and are gradually decomposed by operation for a prolonged period.

It has now been found that cation-exchanging resins being resistant to alkalies and oxygen are obtained by condensing with aldehydes or substances yielding aldehydes in an acid medium ethers of aromatic mono- or polyhydroxy compounds wherein preferably all the hydroxy groups are etherified, said ethers containing already the active groups for ion exchange and/or the active groups being introduced with the aldehydes. Condensation is preferably carried through in a strongly acid medium at temperatures up to 115° C. A suitable aldehyde is especially formaldehyde. The process according to the present invention may also be conducted by precondensing the above ethers with aldehydes, for instance, benzaldehyde, that may contain the active groups for ion exchange, such as, for instance, benzaldehyde disulfonic acid or acetaldehyde disulfonic acid. By drying the gels at 100–120° C. after washing in the usual manner substantially cross-linked condensation products are obtained which, as to their insolubility in water, are by no means inferior to the compounds hitherto obtained from aromatic mono- and polyhydroxy compounds, however, are far superior as to their stability to alkalies and oxidizing agents.

Suitable ethers for the production of cation-exchangers being stable to oxygen and alkalies according to the present invention are ethers of aromatic mono- or polyhydroxy compounds in which the second ether component is of aliphatic or aromatic nature, such as in the arylalkyl ethers and diaryl ethers. As examples may be mentioned anisol, diphenyl ether, phenoxy ethane sulfonic acid, phenoxy acetic acid. The ether bridge may also be a part of another nucleus, such as, for instance, in diphenylene oxide and diphenylene dioxide. The ethers may sometimes contain small amounts of free hydroxy groups; the stability to alkalies and oxygen of the exchange resins prepared from the latter is not essentially reduced compared with the resins produced from pure ethers. The cation-exchanging properties of these resins in most cases meet with the practical demands.

Suitable active groups capable of forming salts with alkalies, besides the sulfonic and carboxyl group are, for instance, the sulfonamide- and cyanamide groups and the nitro-alkyl groups. The active groups may be attached in the ethers to the aromatic nucleus either directly or via an aliphatic side chain. Those arylalkyl ethers are of special importance wherein the active groups are terminally linked to the alkyl radical, for instance, phenoxy acetic acid and phenoxy ethane sulfonic acid. The active groups may also be introduced with an aldehyde component, for instance, with benzaldehyde disulfonic acid.

In many cases it is not necessary to prepare the starting materials to be employed for condensation in pure form or to recover them from their solutions. If, for instance, the sulfonic acid group is introduced as active group for ion exchange by sulfonating an aromatic ether, condensation of the ether containing the sulfonic acid group with aldehyde may be accomplished in the sulfonation mixture. After gel formation the excess sulfuric acid is removed from the resin by washing with water.

For the purpose of diminishing the capacity of the resins for swelling, it has already been proposed to treat exchange resins after condensation with etherifying agents. However, when proceeding in this manner a small portion of the hydroxy groups is etherified. In this case the decrease of the swelling capacity is substantially due to the higher temperature applied during alkylation, at which temperature further cross-linking occurs. The stability to oxygen and alkalies, however, is practically not improved.

The invention is further illustrated by the following examples without being restricted thereto, the parts being by weight.

Example 1

110 parts of anisol are condensed with 208 parts of the sodium salt of benzaldehyde disulfonic acid (74.3%) in 500 parts of sulfuric acid of 80% strength to the triaryl-methane derivative by five hours' heating on the boiling water-bath. After adding further 55 parts of anisol the mixture is allowed to cool to 70° C. and 75 parts of a formalin solution of 30% strength are added. The temperature rises to 100° C. and is reduced to 70° C. by cooling. After adding a further 100 parts of the formalin solution and heating on the water-bath the solution sets to a clear hydrogel within a short period. The hydrogel is kept at a temperature of 90–100° C. for a further about 12–16 hours, thereafter washed with water and dried at 100–110° C. The exchanger thus obtained shows a high exchange capacity and is essentially more stable to oxidizing agents and alkalies than the cation-exchanger prepared in analogous manner from phenol (instead of anisol).

*Example 2*

200 parts of diphenyl ether are sulfonated with 300 parts of the monohydrate of sulfuric acid by two hours' heating at 98–99° C. on the water-bath with stirring. The sulfonation mixture is allowed to cool, thereafter 320 parts of a formalin solution of 30% strength are added and the mixture is refluxed at boiling temperature for about one hour. After heating at 95° C. for about 16–20 hours the resinous solution sets to a clear gel which is comminuted and dried after washing the sulfuric acid with water at 110° C. for three days.

The exchanger thus obtained has a high capacity and is stable to alkalies also in the presence of atmospheric oxygen. When used as a hydrogen ion exchanger it is capable of setting free strong acids from their salts and is therefore suitable for desalting aqueous solutions in combination with an anion exchanger.

*Example 3*

200 parts of phenoxy ethane sulfonic acid are dissolved in 200 parts of a formalin solution of 30% strength on the boiling water-bath with stirring and heating. A rather strong reaction involving a temperature rise to about 102° C. sets in at about 95° C. The clear solution becomes viscous after two to three hours' stirring and finally solidifies to a clear gel which is after-condensed at 100° C. for about 16 hours. After comminuting the gel is dried at 100° C.

The exchanger thus obtained has a good capacity and is much more stable to aqueous alkalies and to oxygen than resins containing free phenolic hydroxyl groups.

*Example 4*

253 parts of phenoxy acetic acid are boiled in 400 parts of a formalin solution of 30% strength with the addition of 85 parts of toluene sulfonic acid. The clear solution gradually becomes more viscous and finally sets to a gel which is heated for after-condensation in a closed vessel at 100° C. for about 12–16 hours. After crushing the gel is dried at 100° C. The resin shows a high exchange capacity and is stable to caustic soda solution also in the presence of oxidizing agents. Owing to the small dissociation constant of the carboxyl group when using the resin as hydrogen ion exchanger the cations of the salts of weak acids are exchanged only with hydrogen.

*Example 5*

213 parts of the sodium salt of benzaldehyde disulfonic acid (73%) are introduced while stirring within two hours into the emulsion consisting of 168 parts of diphenylene oxide and 1200 parts of sulfuric acid (66%) and heated to 95–97° C. The temperature is slowly raised to 115° C. (within three hours) and kept for about one hour. After cooling to 60–70° C. 400 parts of the monohydrate of sulfuric acid are added. The temperature is then raised from 100° C. to 115° C. within two hours and kept at 115° C. for about 3–4 hours. The resultant clear solution of the condensation product is mixed with 300 parts of a formalin solution (30%) at 60° C. and heated on the boiling water-bath. Gel formation occurs after about 30 minutes. The hydrogel obtained is heated to 95–100° C. for 18 hours and for removing the sulfuric acid subsequently introduced into water and washed. The resin is dried at 100° C. for three days. The exchanger when used as hydrogen exchanger has a high capacity and due to the absence of phenolic OH-groups is stable to alkalies and oxidizing agents.

I claim:

1. The process of producing water insoluble cation-exchanging resins that are resistant to alkalies and oxygen, which comprises condensing in the presence of an acid having an —SO₃H group at elevated temperature (1) an aromatic compound of the class consisting of aromatic sulfonic-acid-group-containing compounds and aromatic carboxylic-acid-group-containing compounds, said sulfonic- and carboxylic-acid-groups being the sole cation-exchanging groups in the compounds, and said compounds being capable of reacting with formaldehyde to yield high molecular water insoluble products and containing at least one etherified phenolic hydroxy radical, but substantially no free phenolic hydroxy radicals, and (2) with a molar excess of a compound selected from the group consisting of formaldehyde and formaldehyde yielding substances, continuing such condensation at least until a gel is formed, and drying the gel at an elevated temperature.

2. A process according to claim 1 wherein the compound (1) is a compound containing at least one phenolic hydroxy group etherified by a group containing a cation exchanging group selected from the class consisting of carboxylic and sulfonic acid groups.

3. A process according to claim 2 wherein the compound (1) is a compound containing at least one phenolic hydroxy group etherified by an alkyl group substituted by a cation-exchanging group selected from the class consisting of carboxylic and sulfonic acid groups.

4. A process according to claim 3 wherein the compound (1) is a compound containing at least one etherified phenolic hydroxy group etherified by an alkyl group substituted by a carboxy group.

5. A process according to claim 4 wherein the compound (1) containing at least one etherified phenolic hydroxy group is phenoxyacetic acid.

6. A process according to claim 1, wherein the aromatic compound (1) is obtained by condensing an aromatic compound containing an etherified phenolic hydroxy group with an aldehyde substituted by a cation-exchanging group selected from the class consisting of carboxylic and sulfonic acid groups.

7. A process according to claim 1, wherein the aromatic compound (1) is obtained by sulfonating an aromatic compound containing an etherified phenolic hydroxy group.

8. A water insoluble resin resistant to alkalies and oxygen having cation-exchanging properties obtained by the process of claim 1.

9. A water insoluble resin resistant to alkalies and oxygen having cation-exchanging properties obtained by the process of claim 2.

10. A water insoluble resin resistant to alkalies and oxygen having cation-exchanging properties obtained by the process of claim 3.

11. A water insoluble resin resistant to alkalies and oxygen having cation-exchanging properties obtained by the process of claim 4.

12. A water insoluble resin resistant to alkalies and oxygen having cation-exchanging properties obtained by the process of claim 5.

13. A water insoluble resin resistant to alkalies and oxygen having cation-exchanging properties obtained by the process of claim 6.

14. A water insoluble resin resistant to alkalies and oxygen having cation-exchanging properties obtained by the process of claim 7.

15. A process of exchanging cations in a liquid medium which comprises contacting said medium with a cation-exchanger obtained by the process of claim 1.

References Cited in the file of this patent

UNITED STATES PATENTS

| Number | Name | Date |
|---|---|---|
| 2,022,389 | Seymour | Nov. 26, 1935 |
| 2,178,829 | Bruson | Nov. 7, 1939 |
| 2,315,951 | Fox | Apr. 6, 1943 |
| 2,469,472 | Nachod | May 10, 1949 |

FOREIGN PATENTS

| Number | Country | Date |
|---|---|---|
| 901,768 | France | Nov. 13, 1944 |
| 952,068 | France | Apr. 25, 1949 |
| 364,040 | Germany | Nov. 16, 1922 |